United States Patent [19]

Oster et al.

[11] Patent Number: 4,632,228

[45] Date of Patent: Dec. 30, 1986

[54] CYLINDER PISTON DEVICE

[75] Inventors: Wilhelm Oster, Eitelborn; Horst Eisenhauer, Laudert, both of Fed. Rep. of Germany

[73] Assignee: Stabilus GmbH, Fed. Rep. of Germany

[21] Appl. No.: 734,976

[22] Filed: May 16, 1985

[30] Foreign Application Priority Data

May 24, 1984 [DE] Fed. Rep. of Germany ....... 3419364

[51] Int. Cl.$^4$ .............................................. F16F 9/50
[52] U.S. Cl. .................... 188/282; 188/300; 188/322.22; 188/322.15; 248/188.2
[58] Field of Search ............. 188/300, 299, 289, 282, 188/319, 322.11, 322.22, 322.15, 322.16, 322.18, 320, 316; 267/124, 127, 126, 64.26, 64.12, 64.15, 129; 248/188.2, 188.5

[56] References Cited

U.S. PATENT DOCUMENTS

| | | | |
|---|---|---|---|
| 1,205,433 | 11/1916 | Christman | 188/319 |
| 3,192,816 | 7/1965 | Zimmerman | 188/319 X |
| 3,388,883 | 6/1968 | Axthammer et al. | 248/188.2 |
| 3,828,897 | 8/1974 | Nandyal | 188/322.18 X |
| 4,079,925 | 3/1978 | Salin | 267/129 |
| 4,230,309 | 10/1980 | Schnitzius | 188/282 |

FOREIGN PATENT DOCUMENTS 1263245 11/1968 Fed. Rep. of Germany .
2111168 6/1983 United Kingdom .

Primary Examiner—George E. A. Halvosa
Assistant Examiner—Michael P. Gilday
Attorney, Agent, or Firm—Brumbaugh, Graves, Donohue & Raymond

[57] ABSTRACT

In a cylinder piston device two working chambers on both sides of a piston are interconnected by a fluid passage. This fluid passage includes in series a first passage section and a second passage section. The first passage section comprises a first bore and a second bore in parallel. The first bore is always open. The second bore is opened and closed by a throttling valve body in response to the direction of axial movement of the piston. The second passage section is opened or closed selectively by a closure body controlled from outside the cylinder.

5 Claims, 3 Drawing Figures

CYLINDER PISTON DEVICE

BACKGROUND OF THE INVENTION

This invention relates to a cylinder piston device to be used in particular as a continuously adjustable lift unit. In such lift unit it is frequently desired that the outward movement of the piston rod under the biasing action of a pressurized fluid is damped whereas the inward movement to be effected by an external force is not damped or less damped.

STATEMENT OF THE PRIOR ART

In German Pat. No. 1 263 245 there is shown a cylinder piston device in which a first passage system section is defined by an annular chamber between a cylindrical outer surface of the piston unit and a cylindrical inner surface of the cylinder. This annular chamber is covered at one axial end thereof by a valve disk. This valve disk is pressed against a valve seat by a coil spring. The valve disk defines a gap between its outer edge and the innver cylindrical surface of the cylinder wall. The valve disk is axially liftable against the action of the coil spring when the piston moves in a first direction and is in contact with the valve seat when the piston moves in the other direction. When the valve disk is in contact with the valve seat the cross-sectional area of the passage is defined by the gap between the radially outer edge of the valve disk and the inner cylindrical surface of the cylinder wall. When the valve disk is lifted from the valve seat a by-pass is opened besides the gap between the outer edge of the valve disk and the inner surface of the cylinderical wall. This by-pass is defined by slots provided at the radially inner edge of the valve disk. The valve disk has necessarily a certain radial play with respect to the cylinder. This radial play affects the cross-sectional area of the passage when the valve disk is in contact with the valve seat. In order to reduce the change of flow cross-sectional area due to the radial play of the valve disk a high precision is to be employed in manufacturing the piston and the valve disk.

OBJECT OF THE INVENTION

It is a primary object of the present invention to provide a cylinder piston device in which the damping characteristics during the highly damped movement of the piston with respect to the cylinder is substantially constant during the lifetime of one specific cylinder device and from sample to sample of a series of cylinder piston devices.

It is a further object of the present invention to obtain the constancy of the damping characteristics with minimum requirements as to the manufacturing precision of the parts responsible for the damping characteristics.

A further object of the present invention is to provide a cylinder piston device of simple construction and of high reliability in operation.

SUMMARY OF THE INVENTION

In view of at least one of the above objects a cylinder piston device comprises a cylinder member having an axis, a cylindrical wall about the axis, and two end walls. A cavity is defined within the cylinder member. A piston rod member extends through at least one of the end walls along the axis and is sealingly guided for axial movement through a guiding and sealing unit adjacent the one end wall. A piston unit is connected to the piston rod member within the cavity and is sealingly guided on an inner cylindrical face of the cylindrical wall. The piston unit defines two working chambers within the cavity. A passage system in the piston unit interconnects the working chambers. This passage system includes in series arrangement a first passage system section and a second passage system section. The first passage system section has a flow cross-sectional area variable in response to the direction of axial movement of the piston rod member. The second passage system section is closeable by a closure member controlled from outside the cylinder piston unit. A body of pressurized fluid is provided within the cavity in both working chambers. The first passage system section comprises two separate channel systems in parallel, namely a first channel system and a second channel system. A throttling valve member is associated with the second channel system for opening and closing the second channel system in response to the direction of axial movement of the piston rod member.

During the movement of the piston unit which is to be highly damped, the second channel system is closed and only the first channel system is open. So, the damping characteristics are only dependent on the cross-sectional area of the first channel system, which cross-sectional area is constant during the lifetime of the device and can be easily made constant from sample to sample in a series of piston cylinder devices.

The various features of novelty which characterize the invention are pointed out with particularity in the claims annexed to and forming a part of this disclosure. The features as disclosed in the subclaims are of particular interest for a simple and economic design. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWING

The invention will be explained in greater detail below by reference to some examples of embodiments illustrated in the drawings, wherein.

Figure 1:
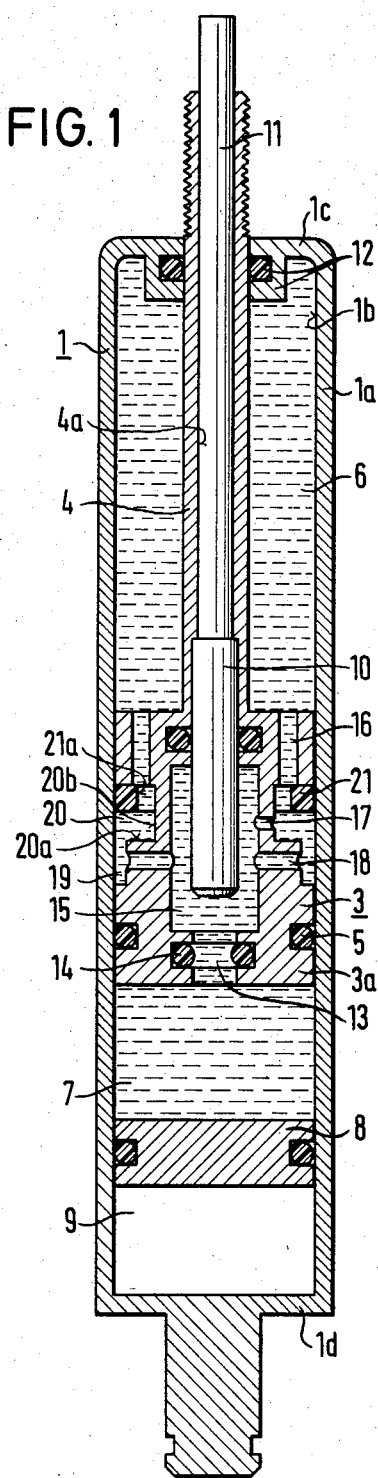
FIG. 1 shows a longitudinal section through a steplessly blockable cylinder piston device of this invention according to a first embodiment.

The cylinder piston device of FIG. 1 comprises a cylinder member 1 having a cylindrical wall 1a with an inner cylindrical surface 1b, a first end wall 1c and a second end wall 1d. A piston rod 4 extends along the axis of the cylinder 1 through a piston rod guiding and sealing device 12 provided adjacent the end wall 1c. A piston unit 3 is connected with the piston rod 4 within the cavity 6, 7 defined within the cylinder 1. The cavity 6, 7 is separated by the cylinder unit 3 into two working chambers 6 and 7. The two working chambers 6 and 7 are filled with a liquid. This liquid is kept under pressure by a pressurized gas contained in a compensation chamber 9. The compensation chamber 9 is separated from the working chamber 7 through an axially movable separation wall 8. The working chambers 6 and 7 are interconnected through a passage system. This passage system comprises axial bores 16, a throttling member receiving groove 20, a radial bore 17, a group of radial bores 18, a collecting chamber 15, and an axial bore 13. The piston unit 3 comprises a piston member 3a.

The piston unit 3 is provided with an annular sealing member 5 which is in sealing engagement with both the piston unit 3 and the inner cylindrical wall 1b of the cylindrical wall 1a. The piston rod member 4 is provided with an axial bore 4a. This axial bore 4a accommodates a control rod 11 and a closure member 10. The closure member 10 is to cooperate with a sealing ring 14 provided in the axial bore 13.

The radial bore 17 extends from the throttling member receiving groove 20 to the collecting chamber 15. The radial bores 18 extend from an annular interconnecting groove 19 to the collecting chamber 15. The annular interconnecting groove 19 opens into an end face 20a of the annular throttling member receiving groove and is therefore in connection with the annular throttling member receiving groove 20. In the throttling member receiving groove 20 there is provided an annular throttling valve member 21 which is in frictional engagment with the inner cylindrical surface 1b. When the piston rod member 4 is moved downwards, as seen in FIG. 1, the annular throttling valve member 21 is in the position as shown in FIG. 1 with respect to the annular throttling member receiving groove 20 such that both radial bores 17 and 18 interconnect the annular throttling member receiving groove 20 with the collecting chamber 15. At the same time the axial bores 16 connect the working chamber 6 with the annular throttling member receiving groove 20 and the axial bore 13 connects the collecting chamber 15 with the working chamber 7. This means that on inward movement of the piston rod member 4 and the piston unit 3 a liquid can pass from the working chamber 7 to the working chamber 6 without substantial throttling action. The only resistance resisting to downward or inward movement of the piston rod member 4 results from the pressure of the liquid acting onto the cross-sectional area of the piston rod member 4.

On outward or upward movement of the piston rod member 4 and the piston unit 3, as seen in FIG. 1, the annular throttling valve member 21 is moved with respect to the annular throttling member receiving groove 20 such as to be seated on the end face 20a and such as to close the annular interconnecting groove 19 and the radial bores 18. This means that on upward or outward movement of the piston rod member 4 a throttling effect is obtained because the liquid can flow only through the radial bores 17, the cross-sectional area of which defines the throttling effect.

It is to be noted that the annular throttling valve member 21 has an inner circumferential face 21a which has a larger diameter than the annular surface 20b of the annular throttling member receiving groove 20.

When the cylinder piston device or blockable lift unit is to be blocked the closure member 10 is moved downwards, as seen in FIG. 1, such as to sealingly engage the sealing ring 14.

A first passage system section is defined by the annular throttling member receiving groove 20, the annular interconnecting groove 19, the radial bore 17 and the radial bores 18. This first passage system section 20, 19, 17, 18 comprises a first channel system 20, 17 and a second channel system 19, 18. The first passage system section 20, 19, 17, 18 is in series with a second passage system section defined by the axial bore 13.

Figure 2:
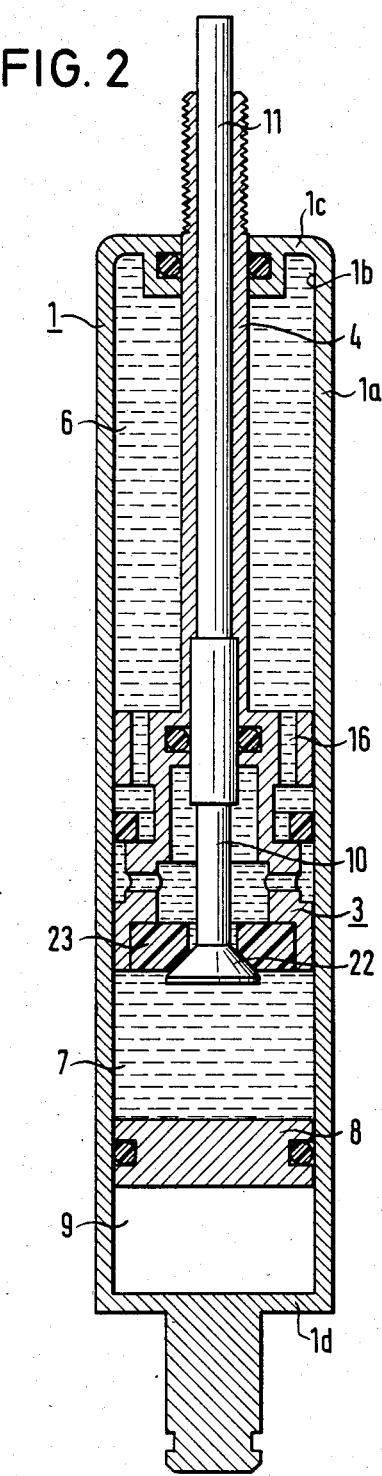
FIG. 2 shows a longitudinal section through a steplessly blockable cylinder piston device of this invention according to a second embodiment.

The form of embodiment according to FIG. 2 differs from that according to FIG. 1 essentially in that the closure member 10 is pressed with a head portion 22 upon a valve seat 23 by the pressure in the working chamber 7.

To release the hydraulic blocking, the control rod 11 is pushed downward, as seen in FIG. 2.

Figure 3:
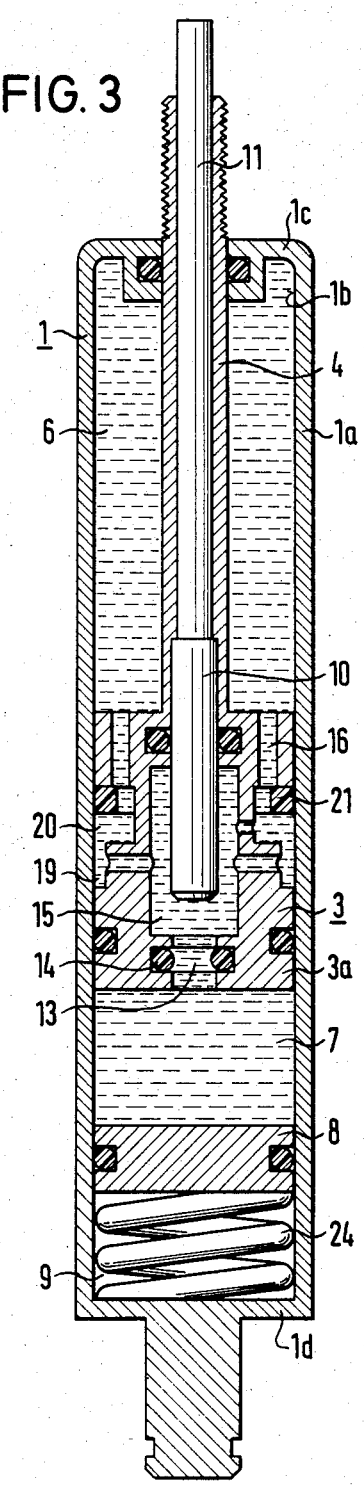
FIG. 3 shows a steplessly blockable cylinder piston device of this invention according to a third embodiment.

In the embodiment of FIG. 3 the pressurized gas within the compensation chamber 9 has been replaced by a helical compression spring 24.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A cylinder piston device comprising:
   a cylinder member (1) having an axis, a cylindrical wall (1a) about said axis, and two end walls (1c, 1d), a cavity (6, 7) being defined within said cylinder member (1);
   a piston rod member (4) extending through at least one (1c) of said end walls along said axis and being sealingly guided for axial movement through a guiding and sealing unit (12) adjacent said one wall (1c),
   a piston unit (3) connected to said piston rod member (4) within said cavity (6, 7) and sealingly guided on an inner cylindrical face (1b) of said cyulindrical wall (1a), said piston unit (3) defining two working chambers (6 and 7) within said cavity (6, 7);
   a passage system in said piston unit (3) interconnecting said working chambers (6 and 7), said passage system including in series arrangement a first passage system section (20, 19, 17, 18) and a second passage system section (13), said first passage system section (20, 19, 17, 18) having a flow cross-sectional area variable in response to the direction of axial movement of said piston rod member (4), said second passage system section (13) being closeable by a closure member (10) controlled from outside said cylinder piston unit;
   a body of pressurized fluid within said cavity (6,7) in both said working chambers (6 and 7);
   said first passage system section (20, 19, 17, 18) comprising within a piston member (3a) of said piston unit two separate channel systems (17, 18) in parallel, namely a first channel system (20, 17) and a second channel system (19, 18);
   a throttling valve member (21) being associated with said second channel system (19, 18) for opening and closing said second channel system (19, 18) in response to the direction of axial movement of said piston rod member (4);
   said throttling valve member being annular and housed in an annular throttling member receiving groove (20) of said piston unit (3) and being axially movable within said annular throttling member receiving groove in response to the direction of axial movement of said piston rod member (4);
   the second channel system (19, 18) having one end opening into one end face (20a) of said annular throttling member receiving groove, said one end of said second channel system (19, 18) being closeable by said annular throttling valve member (21)

and said second channel system (19, 18) comprising both an interconnecting groove (19) in said piston unit (3) radially open towards said cylinder wall (1a) and opening into said one end face (20a) of said annular throttling member receiving groove and at least one first radial channel (18) extending from said interconnecting groove (19) radially inward of said piston unit (3);

and the first channel system (20, 17) comprising at least one first radial channel (17) extending from said throttling member receiving groove (20) in a radial direction within said piston unit axially spaced from said radial channel (18) of the second channel system;

and said throttling member receiving groove (20) having an annular surface (20b) opposed to a radially inner circumferential face (21a) of said annular throttling valve member (21), the diameter of said annular surface (20b) being smaller than the diameter of said inner circumferential face (21a) of said annular throttling valve member (21).

2. A cylinder piston device as set forth in claim 1 in which the interconnecting groove (19) is annular and is completely closed off by said throttling member (21) on upward movement of the piston unit.

3. A cylinder piston device as set forth in claim 2, said first (20, 17) and said second (19, 18) channel systems being connected to a central collecting chamber (15) within said piston unit (3).

4. A cylinder piston device as set forth in claim 2, said collecting chamber (15) having an exit, said exit defining said second passage system section (13).

5. A cylinder piston device as set forth in claim 2, said closure member (10) being controlled through an axial bore (4a) of said piston rod member (4).

* * * * *